(12) United States Patent
Pan (10) Patent No.: US 6,923,887 B2
(45) Date of Patent: Aug. 2, 2005

(54) METHOD FOR HYDROGEN PEROXIDE BLEACHING OF PULP USING AN ORGANIC SOLVENT IN THE BLEACHING MEDIUM

(75) Inventor: George Pan, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 126 days.

(21) Appl. No.: 10/369,688

(22) Filed: Feb. 21, 2003

(65) Prior Publication Data

US 2004/0163779 A1 Aug. 26, 2004

(51) Int. Cl.⁷ .................................................. D21C 9/16
(52) U.S. Cl. .............................. 162/6; 162/72; 162/77; 162/78; 162/80; 162/90
(58) Field of Search .............................. 162/5, 6, 8, 65, 162/72, 77, 78, 80, 90; 8/111

(56) References Cited

U.S. PATENT DOCUMENTS

| | | | |
|---|---|---|---|
| 4,100,016 A | 7/1978 | Diebold et al. | |
| 4,229,252 A | 10/1980 | Meredith | |
| 4,594,130 A | 6/1986 | Chang et al. | |
| 4,767,500 A | 8/1988 | Patt et al. | |
| 4,956,048 A | 9/1990 | Hise | |
| 5,252,183 A | * 10/1993 | Shaban et al. | 162/77 |
| 5,470,433 A | 11/1995 | Brodersen et al. | |
| 5,507,913 A | 4/1996 | Murphy et al. | |
| 5,609,723 A | * 3/1997 | Silinas et al. | 162/65 |
| 5,685,953 A | 11/1997 | Solinas et al. | |
| 6,136,041 A | * 10/2000 | Jaschinski et al. | 8/111 |

OTHER PUBLICATIONS

Kleinert, "Organosolv pulping with aqueous alcohol", Tappi Journal, vol. 57, No. 8, pp. 99–102, Aug. 1974.
Mbachu et al., "The effect of acetic and formic acid pretreatment on pulp bleaching with ozone", Tappi Journal, vol. 64, No. 1, pp. 67–70, Jan. 1981.
Lora et al., "Organsolv pulping: a versatile approach to wood refining", Tappi Journal, vol. 68, No. 8, pp. 94–97, Aug. 1985.
Zarubin et al., "Delignification by oxygen in acetone–water media", Tappi Journal, pp. 163–168, Nov. 1989.
Dahlmann et al., "The Organocell process–pulping with the environment in mind", Tappi Journal, pp. 237–240, Apr. 1990.

(Continued)

Primary Examiner—Steve Alvo
(74) Attorney, Agent, or Firm—Freedman & Associates (57) ABSTRACT

Disclosed is a method for pulp bleaching. The method comprises the steps of providing a pulp sample for bleaching, the pulp sample stemming from a pulp producing process, providing a bleaching liquor comprising water and an organic component as solvent components constituting a bleaching medium, dissolved within are at least a bleaching agent, and a basic agent; and subjecting the pulp sample to the bleaching liquor for a predefined amount of time at predefined bleaching conditions. A preferred bleaching agent is hydrogen peroxide. The organic component amounts to at least 5% in weight of the bleaching medium.

12 Claims, 6 Drawing Sheets

OTHER PUBLICATIONS

Pye et al., "The Alcell™ process", Tappi Journal, pp. 113–118, Mar. 1991.

Norman et al., "Methanol–reinforced kraft pulping", Tappi Journal, vol. 76, No. 3, pp. 125–130, Mar. 1993.

Stockburger, "An overview or near–commercial and commercial solvent–based pulping processes" Tappi Journal, vol. 76, No. 6, pp. 71–74, Jun. 1993.

Xu et al., "Towards a selective ozone bleaching stage by addition of organic oxygenates" Pulp & Paper Canada, vol. 96, No. 9, pp. 49–53.

Ni et al., "Improved ozone bleaching by impregnation of chemical pulps with an acidified mixture of 1,4–dioxane and water", International Pulp Bleaching Conference, TAPPI Proceedings, pp. 213–218, 1996.

Ruiz et al., "Ozone organoslov bleaching of radiata pine kraft pulp", Wood Science and Technology, vol. 31, pp. 217–223, 1997.

Brogdon et al., "Bleaching of softwood kraft pulps using an ethanol–based partial sequence", Institute of Paper Science and Technology, 1997.

Kang et al., "Mechanism of cellulose protection in a novel and selective ozone pulp bleaching process", $82^{nd}$ Annual Meeting, Technical Section, CPPA, pp. B303–B310, undated.

* cited by examiner

METHOD FOR HYDROGEN PEROXIDE BLEACHING OF PULP USING AN ORGANIC SOLVENT IN THE BLEACHING MEDIUM

FIELD OF THE INVENTION

The present invention relates generally to a method for bleaching of pulp, and more specifically to hydrogen peroxide bleaching of pulp performed in a bleaching medium comprising water and an organic solvent.

BACKGROUND OF THE INVENTION

In their efforts to meet the demands of today's competitive and worldwide oriented market structures, producers of paper pulp are confronted with stringent requirements for their supplied pulp product to be of the highest quality. For this reason, a standard paper pulp production process usually includes a step of pulp bleaching, considerably improving brightness values of raw pulp, stemming from a mechanical or chemical pulping process.

Typically, the raw pulp is subjected to a treatment with an oxidizing agent, such as a chlorine-containing compound, for example molecular chlorine or a hypochlorite-containing solution, ozone, or a peroxide-containing compound, for example hydrogen peroxide. Stricter environmental demands, however, have increased the need not only to reduce chlorine charges in the bleaching of pulps, but also to replace altogether the chlorine base chemicals from bleaching sequences plants. An option to be used instead of chlorine bleaching is for example pulp bleaching using a peroxide compound as oxidizing agent. The peroxide process is often economically more beneficial, as well as technically easier to realize, when for compared to other processes, such as ozone bleaching. The art of peroxide bleaching involves the use of a bleach composition containing a peroxide compound as oxidant, such as hydrogen peroxide, an alkali source commonly furnished by sodium hydroxide, sodium silicate as buffer as well as hydrogen peroxide stabilizer, and other auxiliary chemical reagents such as magnesium compounds and chelating agents. The process is usually performed at elevated temperature for a given period of time.

The conventional hydrogen peroxide bleaching process, however, is affected by critical limitations in terms of efficiency and selectivity, which are not to be overcome in a straightforward manner by further fine-tuning the process parameters. One of these aspects concerns bleaching efficiency. Hydrogen peroxide bleaching has a typical profile of brightness development in dependence on bleach chemical consumption, in which while increasing a hydrogen peroxide dosage coupled with an adequate amount of alkali, an initial gain in brightness is rapid, then slows down, and finally reaches a plateau. A bleaching process occurring under conditions corresponding to the slow-down phase or to the plateau phase, respectively, is characterized by low efficiency and low selectivity. In this bleaching phase, brightness gain magnitude is smaller while consuming larger amounts of bleach chemicals, and at the same time causing an accelerated drop in pulp yield. This phenomenon is referred to as "brightness ceiling". The brightness level of such a brightness ceiling varies, depending on lignocellulosic species contained within a pulp substrate.

A second aspect associated with peroxide bleaching is bleaching selectivity. In most cases, bleaching is accompanied by pulp yield loss. The yield loss reflects dissolution of components from the pulp fibres into a water-containing phase of a bleaching medium. Typically, the degree of yield loss is much more pronounced when pulp is bleached to high brightness.

It would be highly advantageous to have at one's disposal a method exploiting all beneficial aspects of hydrogen peroxide bleaching of pulp, and allowing for obtaining a high degree of pulp brightness, while at the same time keeping the pulp yield loss at a low value.

SUMMARY OF THE INVENTION

In accordance with the instant invention, there is provided a method for pulp bleaching comprising the steps of providing a pulp sample for bleaching, the pulp sample stemming from a pulp producing process, providing a bleaching liquor comprising water and at least an organic component as solvent components constituting a bleaching medium, dissolved within are at least a bleaching agent, and at least a basic agent, and subjecting the pulp sample to the bleaching liquor for a predefined amount of time at predefined bleaching conditions, wherein the at least an organic component amounts to at least 5% in weight of the bleaching medium.

BRIEF DESCRIPTION OF THE DRAWINGS

An embodiment of the instant invention is now described in conjunction with the following figures, in which.

DETAILED DESCRIPTION OF THE INVENTION

The instant invention will now be described with reference to a particular embodiment thereof, in which an aqueous organic solvent medium comprising ethanol is used in hydrogen peroxide pulping. Of course, the system and method according to the instant invention is not restricted to the particular example described in what follows, but is generally applicable to hydrogen peroxide bleaching utilizing aqueous organic solvents.

The reader will appreciate the instant invention, when essential characteristics of pulp are considered. The dominating raw material for pulp is wood, and three groups of polymer structures dominate wood, namely cellulose, hemicellulose and lignin. Cellulose is a linear polymer consisting of β-D-glucopyranose units connected to each other by 1,4-linkages. About 10 000 monomer units build up the native form of cellulose in wood. The term hemicellulose refers to a group of polymers consisting of one or more of characteristic monomers. Several hundreds of monomer units linked together in a chain make up the hemicelluloses, which can also have shorter side-chains. The composition and relative abundance of different hemicelluloses depends on a particular type of wood. The third component lignin differs from cellulose and hemicellulose, since it is not a carbohydrate, since there is no obvious repeating unit constituting a building block of a lignin structure, and since lignin is colored due to the presence of chromophoric groups.

Pulp retaining all three major wood components is produced from wood by mechanical methods, such as grinding or treatment in a refiner, and is referred to as mechanical pulp. Methods for producing pulp where the lignin is removed to a larger or smaller extent are denoted as chemical pulping. Two main methods exist, namely sulphite cooking and sulphate cooking, also referred to as kraft cooking.

Bleaching processes, improving brightness of a pulp, are either lignin preserving or lignin removing processes. In the former type of processes, the chromophoric groups of the lignin are chemically altered through oxidation, whereas in the later type of processes, lignin is removed form the raw pulp altogether. Other wood components are possibly removed from the pulp as well. The removal of hemicelluloses during bleaching is nothing but a contribution to yield loss. Besides contributing to yield loss, lignin removal has some beneficial effects, including pulp brightening and strengthening. In general, it is preferable when during a bleaching process lignin is removed from the raw pulp, whereas hemicellulose is maintained within the raw pulp.

The method according to the instant invention is characterized by the use of a bleaching medium for hydrogen peroxide bleaching that reduces the dissolution of hemicelluloses and at the same time increases the dissolution of lignin and/or increases the accessibility of chromophoric groups to bleaching reagents. As a result, the method according to the instant invention is characterized by several advantages over conventional methods. The method according to the instant invention shows an improved efficiency and results in a same brightness of a pulp sample at lower peroxide consumption, or conversely, achieves a higher brightness while consuming a same amount of peroxide bleaching agent. The method according to the instant invention is further characterized by an enhanced selectivity. In comparison with conventional methods of peroxide bleaching, a same brightness is obtained, while at the same time obtaining a higher pulp yield.

The method according to the instant invention is applicable to high yield lignicellulosic pulps made from woody fibre materials, hardwood and softwood, and non-woody fibre materials, such as cereal straws, hemp and flax. It is applicable to current conditions of conventional hydrogen peroxide bleaching processes being industrially practiced. Compared to conventional hydrogen peroxide bleaching methods, the method according to the instant invention uses at least an organic solvent as partial substitute for water in diluting and mixing lignocellulosic fibres with bleach chemicals in a hydrogen peroxide bleaching operation. Such organic solvents belong to a group of solvents, characterized by good miscibility with water, poor solvency for hemicelluloses, and good solvency for lignin. Examples for such solvents are alcohols, such as ethanol and methanol, and dioxane.

Bleaching processes using alcohol and peroxide compounds are known in the art; however, none of the processes described in the prior art utilizes peroxide bleaching in the presence of an alcohol. For example, U.S. Pat. No. 5,252,183 to Shaban et al., issued Oct. 12, 1993, discloses a method for pulping and bleaching using a hydroperoxide and an alcohol. In particular, a process is disclosed for producing bleached pulp from a fibrous plant material, comprising the steps of producing an alcohol and a hydroperoxide, separating said alcohol from said hydroperoxide, passing said alcohol and said hydroperoxide to an integrated pulping and bleaching system, said integrated pulping and bleaching system including a pulping zone and a bleaching zone, wherein said alcohol is passed to said pulping zone and said hydroperoxide is passed to said bleaching zone, contacting said fibrous plant material with said alcohol in said pulping zone, wherein said fibrous plant material is delignified upon contacting of said fibrous plant with said alcohol, and pulp is formed from said fibrous plant material, contacting said pulp with said hydroperoxide in said bleaching zone to effect bleaching thereof, and recovering from said bleaching zone bleached pulp. Clearly, the process of delignification is separated from the process of chemically altering chromophoric groups through a process of oxidation.

According to the method of the instant invention, pulps are bleached with oxygen-based bleaching reagents, such as hydrogen peroxide, in an aqueous medium containing an organic solvent such as ethanol, the ethanol/water weight ratio amounting to at least 5% ethanol up to 85% ethanol. Preferably, the ethanol/water weight ratio amounts to 50% ethanol. A typical bleaching medium comprises a 10% pulp consistency, and contains about 4% $H_2O_2$, about 3% NaOH, and about 3% $Na_2SiO_3$, the chemical charges based on dry weight of pulp. Typically, pulp is bleached for three hours at 50° C.

Figure 1:
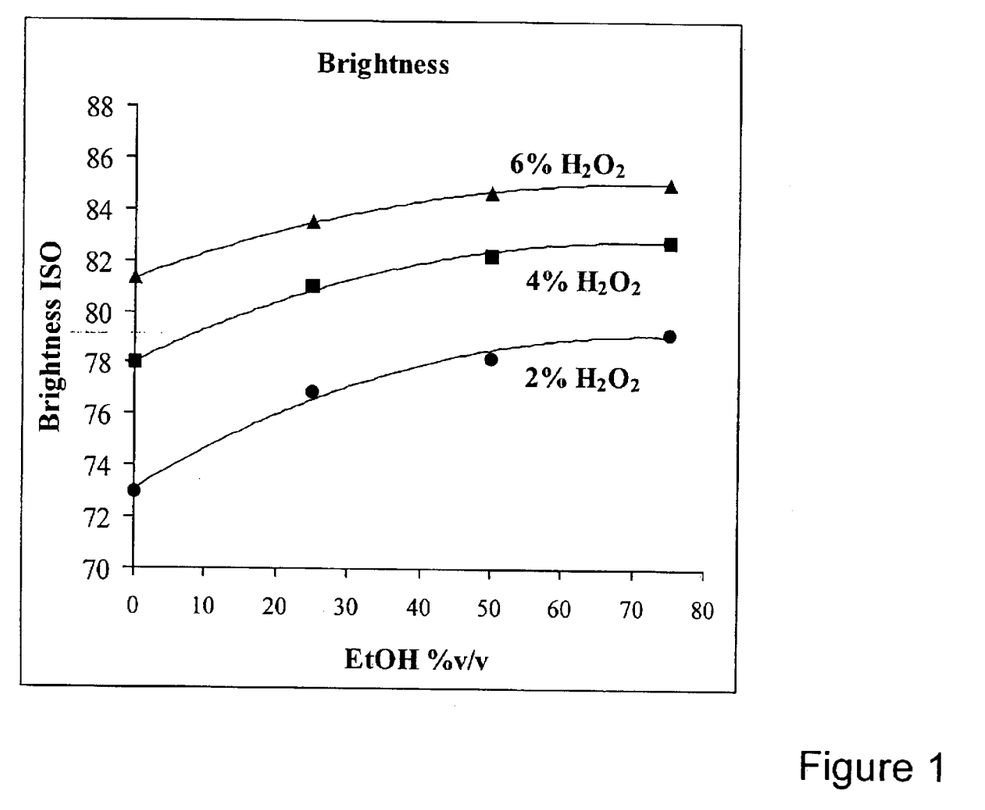
FIG. 1 shows three graphs for three concentration of hydrogen peroxide in a bleaching medium displaying pulp brightness in dependence of ethanol content in an aqueous organic solvent medium.

Referring now to FIG. 1, shown are three graphs for different $H_2O_2$ concentrations illustrating the bleaching performance for aspen pulp as a function of ethanol substitution rate. Bleaching conditions for aspen pulp are 10% pulp consistency, a bleaching duration of two hours at 60° C., 3% of $Na_2SiO_3$, and a $NaOH/H_2O_2$ ratio of 0.75 for hydrogen peroxide concentrations of 2%, 4%, and 6%, respectively. Displayed is ISO brightness as a function of percentage ethanol content. FIG. 1 illustrates that brightness increases with an increased ethanol content for the three hydrogen peroxide concentrations.

Figure 2:
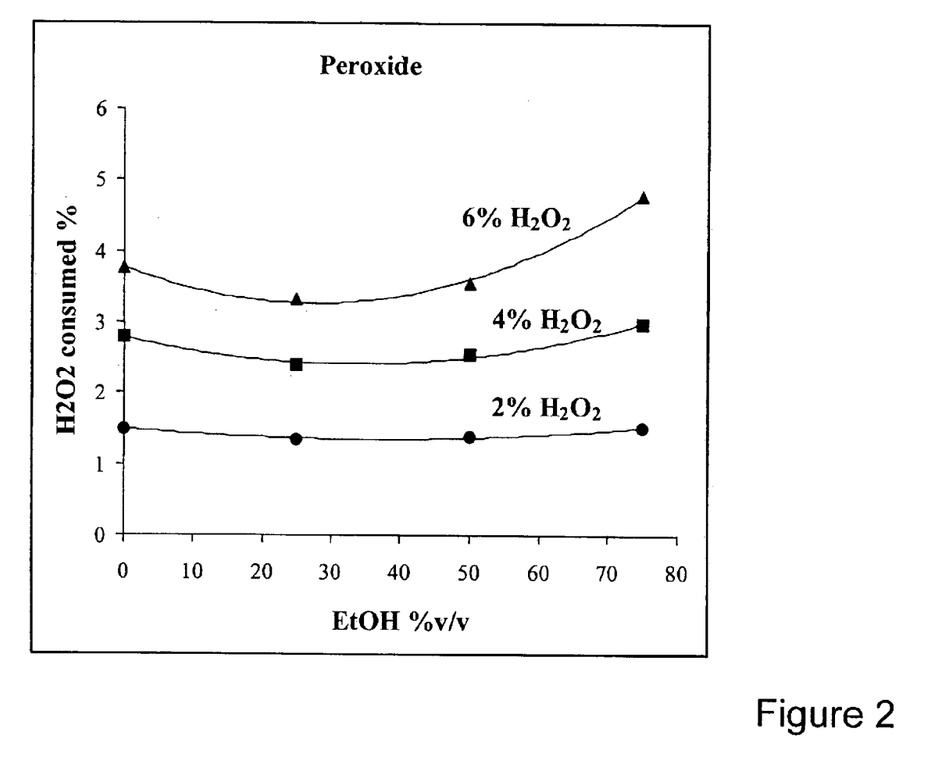
FIG. 2 shows three graphs for three concentration of hydrogen peroxide in a bleaching medium displaying hydrogen peroxide consumption in dependence of ethanol content in an aqueous organic solvent medium.

Referring now to FIG. 2, shown are three graphs for different $H_2O_2$ concentrations illustrating the bleaching performance for aspen pulp as a function of ethanol substitution rate. Bleaching conditions are the same as given for FIG. 1. Displayed is $H_2O_2$ as a function of percentage ethanol content. Depending on initial concentration, hydrogen peroxide slightly decreases or stays constant, while increasing the ethanol content up to 50%. Increasing the ethanol content above 50% leads to an increase in hydrogen peroxide consumption.

Figure 3:
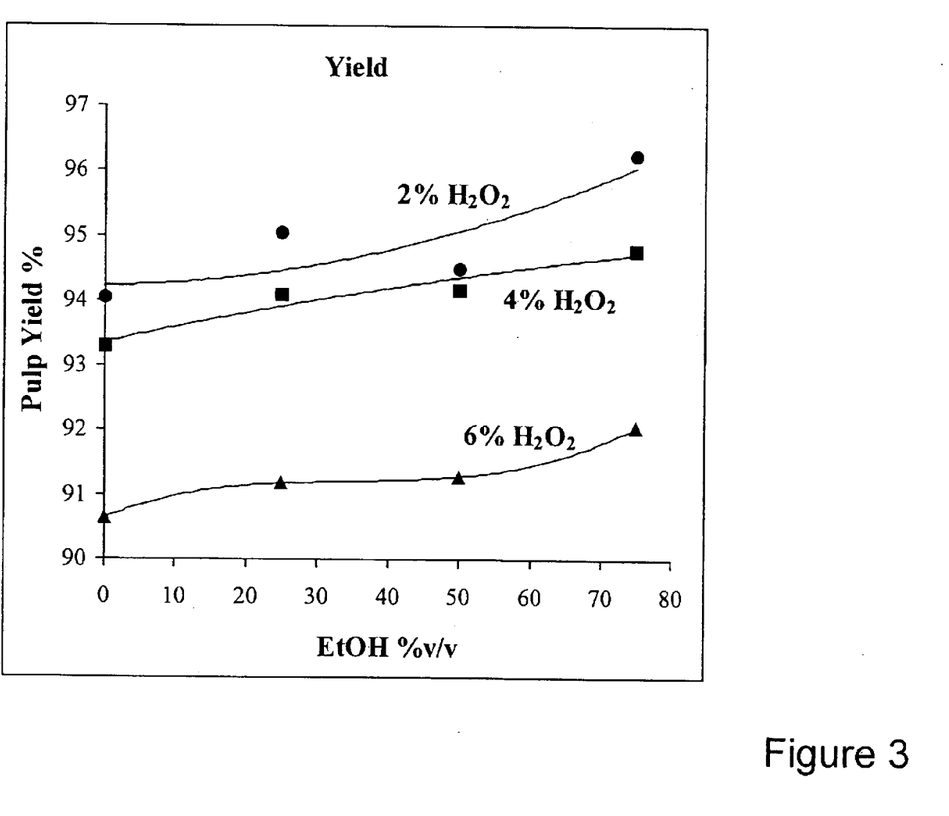
FIG. 3 shows three graphs for three concentration of hydrogen peroxide in a bleaching medium displaying pulp yield in dependence of ethanol content in an aqueous organic solvent medium.

Referring now to FIG. 3, shown are three graphs for different $H_2O_2$ concentrations illustrating the bleaching performance for aspen pulp as a function of ethanol substitution rate. Bleaching conditions are the same as given for FIG. 1. Displayed is pulp yield as a function of percentage ethanol content. FIG. 3 illustrates that pulp yield increases with an increased ethanol content for the three hydrogen peroxide concentrations.

Figure 4:
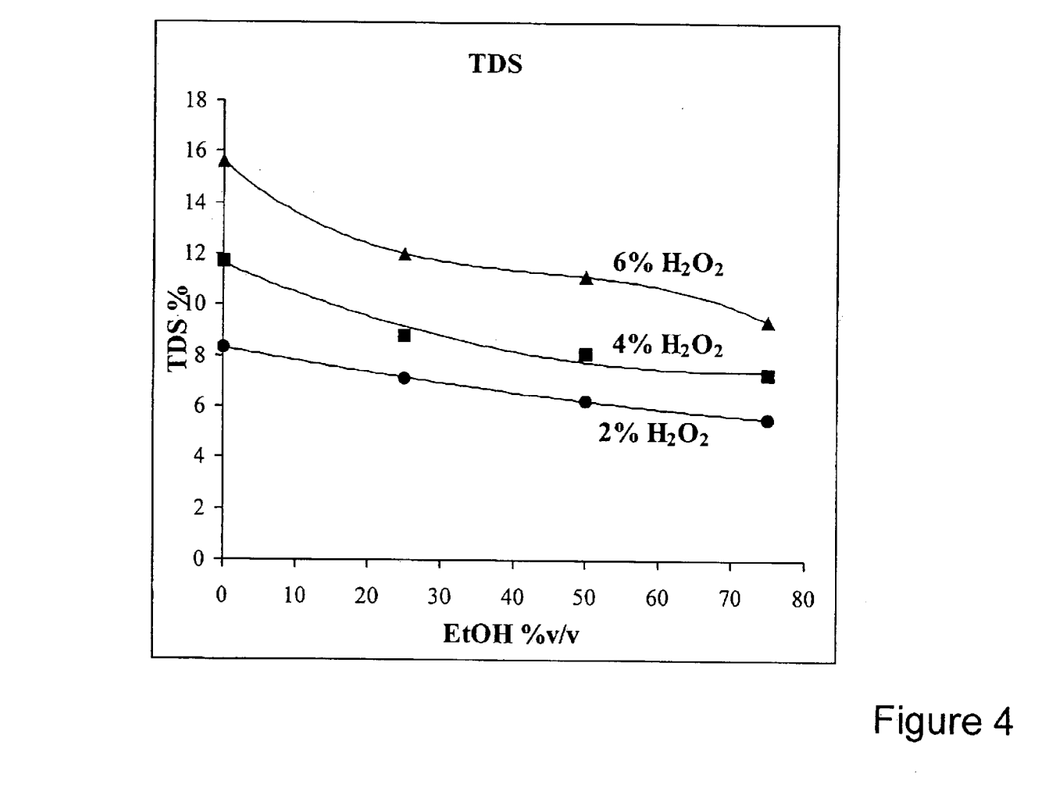
FIG. 4 shows three graphs for three concentration of hydrogen peroxide in a bleaching medium displaying amount of total dissolved solids in dependence of ethanol content in an aqueous organic solvent medium.

Referring now to FIG. 4, shown are three graphs for different $H_2O_2$ concentrations illustrating the bleaching performance for aspen pulp as a function of ethanol substitution rate. Bleaching conditions are the same as given for FIG. 1. Displayed is total dissolved solid (TDS) content as a function of percentage ethanol content. FIG. 4 illustrates that an amount of TDS decreases with an increased ethanol content for the three hydrogen peroxide concentrations.

FIGS. 1 to 4 illustrate the beneficial effects of ethanol substitution in hydrogen peroxide bleaching. Pulp brightness increases, pulp yield increases, and TDS decreases, when the amount of ethanol substitution increases. A notable increase in hydrogen peroxide consumption is noted for ethanol substitution rates exceeding 50%. Further, ethanol substitution has little effect on pulp physical properties. FIGS. 1 to 4 suggest that bleaching is preferably performed at an ethanol substitution rate of about 50%. However, the beneficial effects of ethanol substitution are already apparent at ethanol substitution rates of about 5%.

Figure 5:
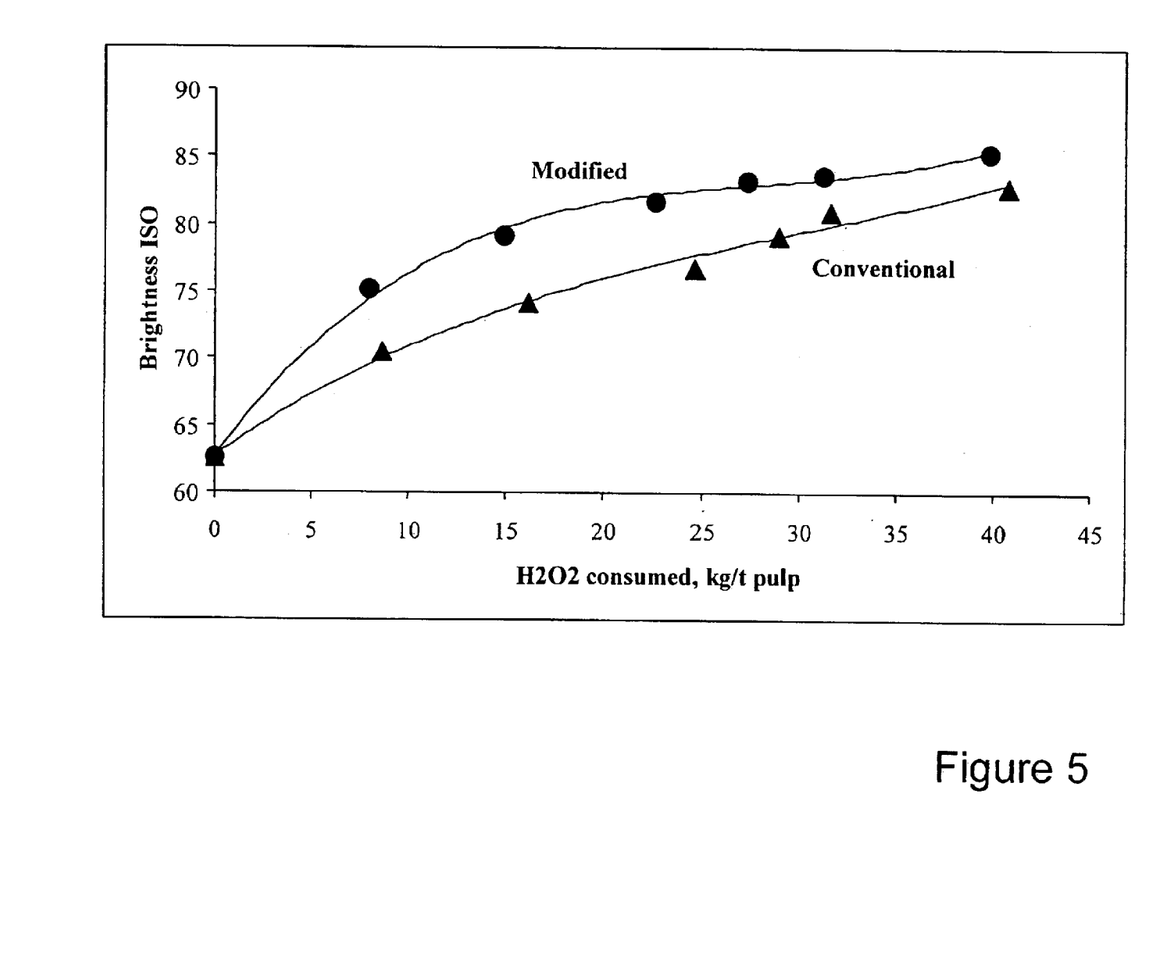
FIG. 5 shows two graphs displaying the dependence of brightness on hydrogen peroxide consumption in aspen pulp bleaching for a conventional method and a method according to the instant invention.

Referring now to FIG. 5, shown are graphs comparing conventional hydrogen peroxide bleaching with hydrogen peroxide bleaching for the method according to the instant invention. Displayed is dependence of pulp brightness on hydrogen peroxide consumption in aspen pulp bleaching. It is possible to bleach pulps under otherwise same conditions to target brightness at lower peroxide consumption. As shown in FIG. 5, in order to attain an ISO brightness of 80, the conventional process consumes approximately 30 kg $H_2O_2$ per ton dry pulp, whereas the process according to the instant invention consumes approximately 15 kg $H_2O_2$ per ton dry pulp. The saving of bleach chemicals is about 50%.

Figure 6:
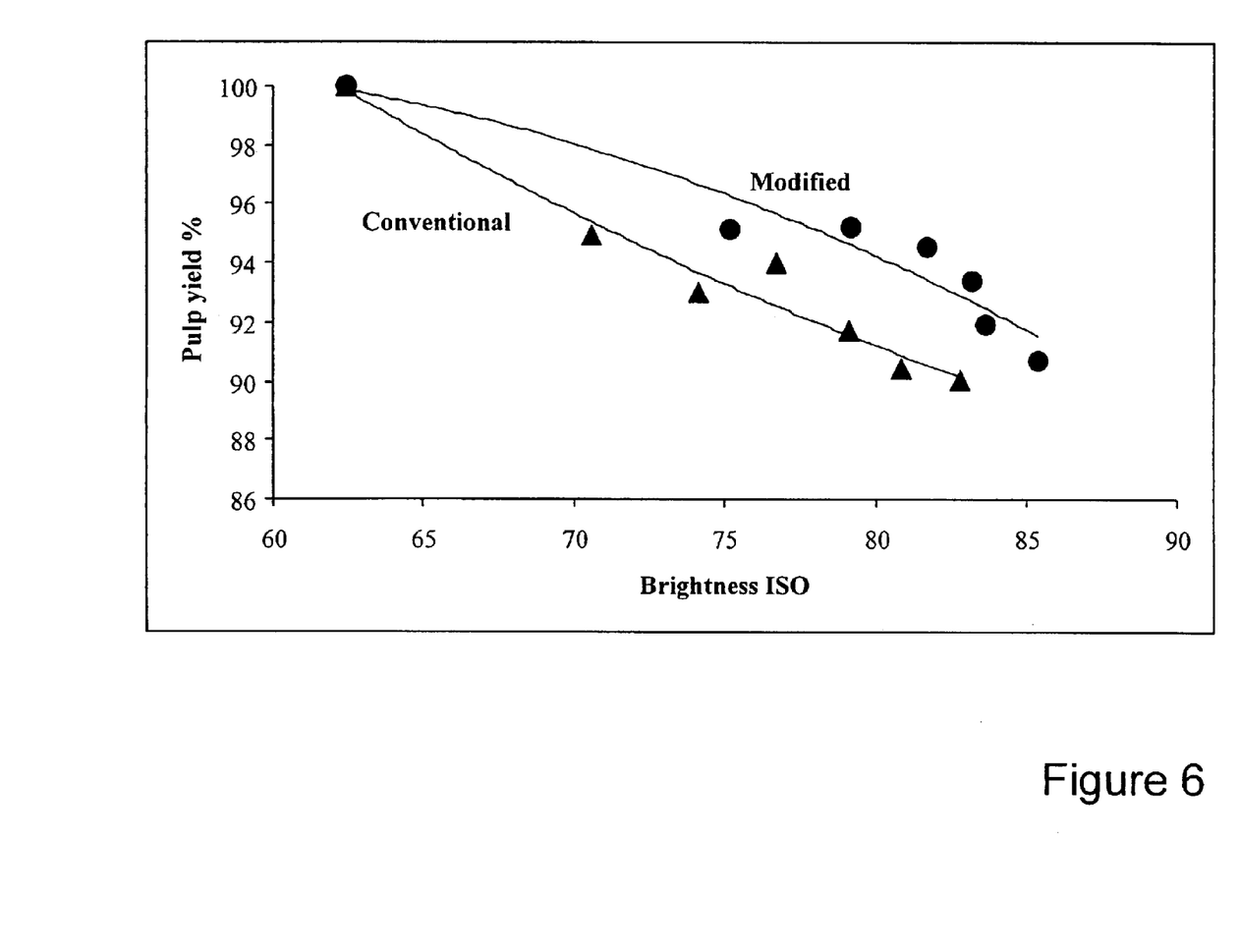
FIG. 6 shows two graphs displaying the dependence of pulp yield on brightness in aspen pulp bleaching for a conventional method and a method according to the instant invention.

Referring now to FIG. 6, shown are graphs comparing conventional hydrogen peroxide bleaching with hydrogen peroxide bleaching for the method according to the instant invention. Displayed is dependence of pulp yield as a function of ISO brightness. Under otherwise same conditions, it is possible to bleach pulps to target brightness with higher yield. As shown in FIG. 6, bleached aspen pulp with an ISO brightness of 80 has 91% pulp yield by conventional process and 94% pulp yield by the process according to the instant invention.

The novelty of the method according to the instant invention is the use of a modified bleaching medium, namely an organic solvent-water mixture, instead of a 100% aqueous medium as used in conventional bleaching, to render a lignin chromophore more accessible to bleaching agents, and hemicelluloses less soluble in bleaching agents. As a result, pulp brightness as well as pulp yield are increased. As pulps produced by a mechanical pulping process retain almost all fiber components, such as lignin and hemicelluloses, the method according to the instant invention is preferably used for bleaching of mechanical pulps. However, the method according to the instant invention equally applies to pulp from other pulping processes, such as chemical pulps, as well. Also, the method according to the instant invention is further applicable to recycled fibres, which are mechanical pulps, chemical pulps, or mixtures of chemical and mechanical pulps. Recycled fibres stem for example from a paper recycling process.

Readers of the foregoing disclosure will envisage various other embodiments within the spirit and scope of the present invention, the breadth of which is of record in the appended claims.

What is claimed is:

1. A method for hydrogen peroxide bleaching a lignocellulosic pulp comprising lignin and hemicelluloses, the lignin having chromophoric groups which imparts color thereto, the method comprising:

providing a lignocellulosic pulp sample for bleaching, the lignocellulosic pulp sample stemming from a pulp producing process;

providing a bleaching liquor comprising water and an organic component selected from the group consisting of methanol, ethanol and dioxane, the water and the organic component comprising solvent components constituting a bleaching medium;

dissolving within the bleaching liquor at least a basic agent and at least a bleaching agent comprising hydrogen peroxide; and subjecting the lignocellulosic pulp sample to the bleaching liquor containing the at least a basic agent and the at least a bleaching agent comprising hydrogen peroxide, for a predefined amount of time at predefined bleaching conditions;

wherein the organic component amounts to at least 5% in weight of the bleaching medium and is selected for reducing the dissolution of hemicelluloses and at the same time increasing at least one of the dissolution of lignin and the accessibility of the chromophoric groups to the at least a bleaching agent relative to a bleaching medium absent the at least an organic component.

2. A method according to claim 1, wherein the at least a basic agent is selected from the group of inorganic bases.

3. A method according to claim 2, wherein the at least a basic agent is sodium hydroxide.

4. A method according to claim 1, wherein the bleaching medium comprises at least one auxiliary additive.

5. A method according to claim 4, wherein the at least one auxiliary additive is selected from the group of inorganic silicates.

6. A method according to claim 5, wherein the at least one auxiliary agent is $Na_2SiO_3$.

7. A method according to claim 1, wherein the lignocellulosic pulp sample is obtained from a woody fibre material.

8. A method according to claim 7, wherein the woody fibre material includes at least one of softwood and hardwood.

9. A method according to claim 1, wherein the lignocellulosic pulp sample is obtained from a non-woody fibre material.

10. A method according to claim 9, wherein the non-woody fibre material includes at least one of straws, hemp, and flax.

11. A method according to claim 1, wherein the lignocellulosic pulp producing process is one of a mechanical pulping process, a chemical pulping process, or a paper recycling process.

12. A method according to claim 1, wherein the at least an organic component amounts to at least 25% in weight of the bleaching medium.

* * * * *